US006115024A

United States Patent [19]
Hayama

[11] Patent Number: 6,115,024

[45] Date of Patent: Sep. 5, 2000

[54] IMAGE DISPLAY DEVICE

[75] Inventor: Hitoshi Hayama, Nagano, Japan

[73] Assignee: Seiko Epson Corporation, Tokyo, Japan

[21] Appl. No.: 09/069,066

[22] Filed: Apr. 28, 1998

[30] Foreign Application Priority Data

Apr. 30, 1997 [JP] Japan .................................... 9-126428

[51] Int. Cl.[7] ............................ G09G 5/40; G06H 15/00; G06F 3/00; G06K 15/00

[52] U.S. Cl. ......................... 345/116; 345/117; 358/1.18; 358/1.17; 707/518; 707/531; 707/526; 400/615.2; 400/83

[58] Field of Search .................................... 345/116, 117, 345/502, 192, 127, 418, 348, 352, 353, 326; 707/526, 529, 531, 518, 505, 514, 516, 522; 358/1.18, 113, 115; 705/408, 410, 411, 416; 395/101, 102, 117; 400/62, 63, 103, 104, 83

[56] References Cited

U.S. PATENT DOCUMENTS

| | | | |
|---|---|---|---|
| 4,001,814 | 1/1977 | Morris | 340/365 R |
| 4,718,784 | 1/1988 | Drisko | 400/68 |
| 4,932,485 | 6/1990 | Mori | 177/25.15 |
| 5,584,591 | 12/1996 | Mori | 400/615.2 |
| 5,602,743 | 2/1997 | Freytag | 364/416.18 |
| 5,677,999 | 10/1997 | Hidaka | 395/102 |
| 5,873,110 | 2/1999 | Toyosawa | 707/518 |
| 5,933,589 | 8/1999 | Hidaka | 395/117 |
| 6,006,211 | 12/1999 | Sansone | 705/410 |
| 6,032,138 | 2/2000 | Mcfiggans | 705/410 |

*Primary Examiner*—Mark R. Powell
*Assistant Examiner*—Wesner Sajous
*Attorney, Agent, or Firm*—Hogan & Hartson, LLP

[57] ABSTRACT

There is provided an image display device which is capable of clearly displaying the use of each fixed format for forming an image and the image formed according to the fixed format on a small-sized display screen with small memory capacity. A display device is switched between a text display mode for displaying an image of a character string corresponding to text data on a display screen thereof and an image display mode for displaying an image corresponding to image data on the display screen. In the text display mode, a plurality of fixed formats are selectively displayed for use in creating object image data. The fixed formats each have predetermined entry items to which the text data is to be input. One of the fixed formats presented in the text display mode is selected and set to a designated format. The text data input to the predetermined entry items is stored as input text data. An image representative of part of whole of the object image data created based on the designated fixed format by using the input text data is displayed in the image display mode. If no text data has been input to any of the predetermined entry items of the designated format, there is displayed an image representative of part or whole of the object image data created by using dummy data for the text data to be input to the any of the predetermined entry items.

15 Claims, 16 Drawing Sheets

D
T50
G11a
64dot
224dot
115
T51
G11b
128dot
448dot
T52
G11c
256dot
896dot
T53
G11d
512dot
1792dot
Tel
Fax
18
96dot

FIG. 11

| OPTIONS 1 | OPTIONS 2 | OPTIONS 3 | OPTIONS 4 | ENTRY ITEM 1 | ENTRY ITEM 2 | ENTRY ITEM 3 | ENTRY ITEM 4 | ENTRY ITEM 5 | ENTRY ITEM 6 | ENTRY ITEM 7 |
|---|---|---|---|---|---|---|---|---|---|---|
| Large-sized address (peel-off sticker) | Company address | Portrait | — | Postal code | Address 1 | Address 2 | Company | Tel. No. | FAX No. | |
| | | Landscape | — | Postal code | Address 1 | Address 2 | Company | Tel. No. | FAX No. | |
| | Person in charge | Portrait | — | Postal code | Address 1 | Company | Dept. | Person in charge | Tel. No. | |
| | | Landscape | — | Postal code | Address 1 | Company | Dept. | Person in charge | Tel. No. | |
| | Personal address | Portrait | — | Postal code | Address 1 | Address 2 | Name 1 | Name 2 | Tel. No. | |
| | | Landscape | — | Postal code | Address 1 | Address 2 | Name 1 | Name 2 | Tel. No. | |
| Medium-sized address (peel-off sticker) | Name | Portrait | — | Last name | First name | | | | | |
| | | Landscape | — | Last name | First name | | | | | |
| | With *kana* character | Portrait | — | Last name | First name | Last name with *kana* | First name with *kana* | | | |
| | | Landscape | — | Last name | First name | Last name with *kana* | First name with *kana* | | | |
| | With picture | Portrait | — | Picture | Content | | | | | |
| | | Landscape | — | Picture | Content | | | | | |
| | Inverse | Portrait | — | Content | | | | | | |
| | | Landscape | — | Content | | | | | | |
| Small-sized address (peel-off sticker) | Name | Portrait | — | Last name | First name | | | | | |
| | | Landscape | — | Last name | First name | | | | | |
| | With *kana* character | Portrait | — | Last name | First name | Last name with *kana* | First name with *kana* | | | |
| | | Landscape | — | Last name | First name | Last name with *kana* | First name with *kana* | | | |
| Round type (peel-off sticker) | Divided in two | — | — | Upper item | Lower item | | | | | |
| | Divided in three | — | — | Upper item | Middle item | Lower item | | | | |
| | Encircled | — | — | Upper item | Middle item | Lower item | | | | |

FIG. 12

| OP-TIONS 1 | OP-TIONS 2 | OP-TIONS 3 | OP-TIONS 4 | ENTRY ITEM 1 | ENTRY ITEM 2 | ENTRY ITEM 3 | ENTRY ITEM 4 | ENTRY ITEM 5 | ENTRY ITEM 6 | ENTRY ITEM 7 |
|---|---|---|---|---|---|---|---|---|---|---|
| POP (peel-off sticker) | Vertically arranged | — | — | Product name | Quantity | Retail price | Sale price | Reduction rate | | |
| | Horizontally arranged | — | — | Product name | Quantity | Retail price | Sale price | Reduction rate | | |
| | Separately arranged | — | — | Product name | Quantity | Retail price | Sale price | Reduction rate | | |
| Business card (Correc-tion) | Address section 1 | Portrait | — | Postal code | Address 1 | Address 2 | Tel No. | FAX | E-mail | |
| | | Landscape | — | Postal code | Address 1 | Address 2 | Tel No. | FAX | E-mail | |
| | Address section 2 | Portrait | — | Business division | Postal code | Address 1 | Address 2 | Tel No. | FAX | E-mail |
| | | Landscape | — | Business division | Postal code | Address 1 | Address 2 | Tel No. | FAX | E-mail |
| | Department section | Portrait | — | Business division | Depart-ment | Section | Title | | | |
| | | Landscape | — | Business division | Depart-ment | Section | Title | | | |
| Video (Label) | VHS | Movie | Portrait | Category | Title | | | | | |
| | | | Landscape | Category | Title | | | | | |
| | | | Side-view | Title | Director | Main character | | | | |
| | | TV program | Portrait | Category | Program name | Other | | | | |
| | | | Landscape | Category | Program name | Other | | | | |
| | | | Side-view | Program name | Content | Promoter | TV station | Broadcast on | Time | |
| | | Camera | Portrait | Category | Title | | | | | |
| | | | Landscape | Category | Title | | | | | |
| | | | Side-view | Title | Photo by | Photo on | Time | Memo | | |

FIG. 13A

| OP-TIONS 1 | OP-TIONS 2 | OP-TIONS 3 | OP-TIONS 4 | ENTRY ITEM 1 | ENTRY ITEM 2 | ENTRY ITEM 3 | ENTRY ITEM 4 | ENTRY ITEM 5 | ENTRY ITEM 6 | ENTRY ITEM 7 |
|---|---|---|---|---|---|---|---|---|---|---|
| Video (label) | VHS-C | Movie | Portrait | | | | | | | |
| | | | Landscape | Category | Title | | | | | |
| | | | Side-view | Title | Director | Main character | | | | |
| | | TV program | Portrait | Category | Program name | Other | | | | |
| | | | Landscape | Category | Program name | Other | | | | |
| | | | Side-view | Program name | Content | Promoter | TV station | Broadcast on | Time | |
| | | Photograph | Portrait | Category | Title | | | | | |
| | | | Landscape | Category | Title | | | | | |
| | | | Side-view | Title | Photo by | Photo on | Time | Memo | | |
| | 8 mm | Movie | Portrait | Category | Title | | | | | |
| | | | Landscape | Category | Title | | | | | |
| | | | Side-view | Title | Director | Main character | | | | |
| | | TV program | Portrait | Category | Program name | Other | | | | |
| | | | Landscape | Category | Program name | Other | | | | |
| | | | Side-view | Program name | Content | Promoter | TV station | Broadcast on | Time | |
| | | Photograph | Portrait | Category | Title | | | | | |
| | | | Landscape | Category | Title | | | | | |
| | | | Side-view | Title | Photo by | Photo on | Time | Memo | | |
| | DVC | Portrait | — | Category | Title | | | | | |
| | | Landscape | — | Category | Title | | | | | |

| | | | | | | | | | | |
|---|---|---|---|---|---|---|---|---|---|---|
| MO (label) | | — | — | Manage No. | Item name | | | | | |
| | | — | — | Manage No. | Item name | | | | | |
| | | Program | — | Item name | Version | Content | Producer | Date | | |
| | | Data | — | Manage No. | Item name | Content | Manager | Date | | |
| FD (label) | | — | — | Item name | Version | Content | Producer | Date | | |
| | | — | — | Manage No. | Item name | Content | Manager | Date | | |

FIG. 13B (TOP)

(LEFT)

(RIGHT)

(BOTTOM)

(TOP)

(LEFT)

(RIGHT)

(BOTTOM)

(TOP)

(LEFT)

(RIGHT)

(BOTTOM)

(TOP)

(LEFT)

(RIGHT)

(BOTTOM)

(TOP)

(LEFT)

(RIGHT)

(BOTTOM)

IMAGE DISPLAY DEVICE

BACKGROUND OF THE INVENTION

1. Field of the Invention

This invention relates to an image display device for use in a tape printing apparatus or a stamp making apparatus, and the like.

2. Prior Art

Conventionally, there has been proposed a tape printing apparatus adapted to the utilization of various fixed formats for creating labels for video cassettes, address labels, etc. Such formats enable the user to easily print labels and peel-off stickers simply by entering text data into predetermined data entry areas. Further, there has been proposed a stamp making apparatus which is capable of employing various fixed formats for stamp images conforming to specific types of stamps, e.g. a fixed format for square stamps or one for round stamps.

The image display devices used in the above apparatuses display the available formats on the display screen as the options shown in either character-based menus (see Japanese Laid-Open Patent Publication (Kokai) No. 7-156497) or in image-based menus where the layout of each format is presented in reduced size, thereby enabling the user to select a desired fixed format from the display screen.

It is easy to know the use of each option presented in the character-based menus from the meaning of the name (character string) of the option. However, the user finds it difficult to form in his mind concrete images of labels or stamps formed based on the fixed formats. On the other hand, when using the image-based menus, it is sometimes difficult to know the use of each option presented in image-based menus due to the small size of the option or image representative of the corresponding fixed format displayed on the small-sized display screen used in the above-mentioned apparatuses.

Further, to display the fixed formats in images, the display device is required to store the data for all of the images corresponding to each kind of fixed format that is available for selection. This requires that the device has increased memory capacity, resulting in increased cost and size. This makes the image display device unsuitable for the above-mentioned uses in which the display is required to be of small-size and inexpensive.

SUMMARY OF THE INVENTION

It is the object of the invention to provide an image display device which is capable of clearly displaying the use of each fixed format for forming an image and the image representative of the fixed format on a small-sized display screen with small memory capacity.

To attain the above object, the invention provides an image display device comprising:

- input means for inputting commands and data;
- display means having a display screen, the display means displaying an image of a character string corresponding to text data on the display screen in a text display mode thereof and displaying an image corresponding to image data including object image data on the display screen in an image display mode thereof;
- display mode-switching means for switching between the text display mode and the image display mode of the display means;
- fixed format-presenting means for selectively presenting, in the text display mode of the display means, a plurality of fixed formats for use in creating the object image data, the fixed formats each having predetermined entry items to which the text data is to be input;
- designated format-setting means for selecting one of the fixed formats presented in the text display mode of the display means and setting the selected one of the fixed formats to a designated format;
- input data-storing means for storing the text data input to the predetermined entry items of the designated format as input text data; and
- image display means for displaying, in the image display mode of the display means, an image representative of part of whole of the object image data created based on the designated fixed format by using the input text data,
- the image display means displaying, if no text data has been input to any of the predetermined entry items of the designated format, an image representative of part or whole of the object image data created by using dummy data for the text data to be input to the any of the predetermined entry items of the designated format.

According to this image display device, fixed formats are selectively presented in the text display mode. When one of the fixed formats is set to a designated format and text data is entered to the predetermined entry items of the designated format, it is possible to view, in the image display mode of the display means, an image representative of object image data formed based on the designated format by using the input text data. If text data of character strings presenting the use of each fixed format is provided, messages formed of corresponding character string images can be displayed in the text display mode, which enables the user to know or clearly understand the use of each fixed format presented. Further, if no text data is entered to any of the predetermined entry items of the designated format, there is displayed an image representative of part or whole of the object image data formed using dummy data for the text data to be input to the text data-missing ones of the predetermined entry items. This enables the user to recognize an image of the object image data before text data is fully entered to the entry items of the designated format. Further, the function of viewing object image data formed by using the actually input text data can be used in a shared manner, and the object image data formed by using the dummy data can be viewed simply by defining text data of a symbol, such as "■", as dummy data. Therefore, differently from a conventional method of selecting fixed formats, there is no need to store the data for all of the images corresponding to each kind of fixed format that is available for selection, whereby the required memory capacity can be saved. As a result, according to the image display device of the invention, it is possible to clearly display the use of each fixed formats and the image representative of object image data formed based on the fixed format, on a small-sized display screen with small required memory capacity.

Preferably, the image display means provisionally setting, in the image display mode of the display means, one of the fixed formats being presented in the text display mode to the designated format if the designated format has not been set, and displaying an image representative of part or whole of the object image data created by using the dummy data for the text data to be input to the predetermined entry items of the one of the fixed formats provisionally set to the designated format.

According to this preferred embodiment, when the fixed formats are selectively presented in the text display mode for the user to select one for the designated format, by switching over from the text display mode to the image display mode, the user can view an image representative of part of whole of the object image data created by substituting the dummy data for text data to be input to predetermined entry items of one of the fixed formats being presented in the text display mode. Therefore, the user can have a generally image of each of the fixed format presented for selection before he sets one to the designated format.

Preferably, the image display means includes display range proportion-changing means for changing a proportion of a display range of the object image data to an entire range of the object image data.

According to this preferred embodiment, the proportion of a display range of the object image data to an entire range of the object image data can be changed, whereby it is possible to expand the display range to view the entire and general image representative of the object image data or reduced the same to zoom in the image of a desired portion (range) of object image data to view details of the image. The function of changing the proportion of the display range can also be exploited when object image data is formed by using dummy text data. Therefore, it is possible to more clearly display the image representative of object image data formed based on each fixed format in a small-sized display screen with small required memory capacity without additionally providing a special image-forming function or a special memory area.

More preferably, the display range proportion-changing means changes the proportion of the display range of the object image data to the entire range of the object image data based on a zoom ratio at which a portion of the object image data in the display range is zoomed.

More preferably, the image display means includes conversion means for converting the input text data to the dummy data when the display range proportion-changing means sets the proportion of the display range to a value smaller than a predetermined value.

Preferably, the dummy data is text data for a symbol of which at least one of top, bottom, left, and right sides is discernable.

According to this preferred embodiment, dummy data is employed which enable the user to discern at least one of the top, bottom, left and right sides of the image thereof. This make it easier to recognize the image representative of object image data formed by using the dummy data. Further, it will be more convenient if the dummy data is implemented by text data for a symbol whose orientation can be easily recognized from any direction.

Preferably, the image display device includes font data-storing means which stores font data corresponding to the input text data and the dummy text data and from which the font data is read out.

Preferably, the object image data is print image data for printing on a print material.

According to this preferred embodiment, since the object image data is print image data for printing on a print material, the image display device can be applied to one for a printing apparatus.

More preferably, the print material is a tape material.

According to this preferred embodiment, the image display device can be applied to one for a tape printing apparatus whose print material is a tape material.

Preferably, the object image data is stamp image data for forming a stamp face of a stamp.

According to this preferred embodiment, the object image data used in the image display device is stamp image data for forming a stamp face of a stamp. Therefore, the image display device can be applied to one for a stamping making apparatus.

The above and other objects, features, and advantages of the invention will become more apparent from the following detailed description taken in conjunction with the accompanying drawings.

BRIEF DESCRIPTION OF THE DRAWINGS

FIG. 11 is a diagram showing a list of denotations of available options for selectively determining fixed formats and entry items of each fixed format, which are to be displayed on the screen;

FIG. 12 is a diagram continued from FIG. 11;

DETAILED DESCRIPTION

The invention will now be described in detail with reference to drawings showing embodiments thereof. In these embodiments, an image display device according to the invention is applied to an ink jet printer for printing tapes.

Figure 1:
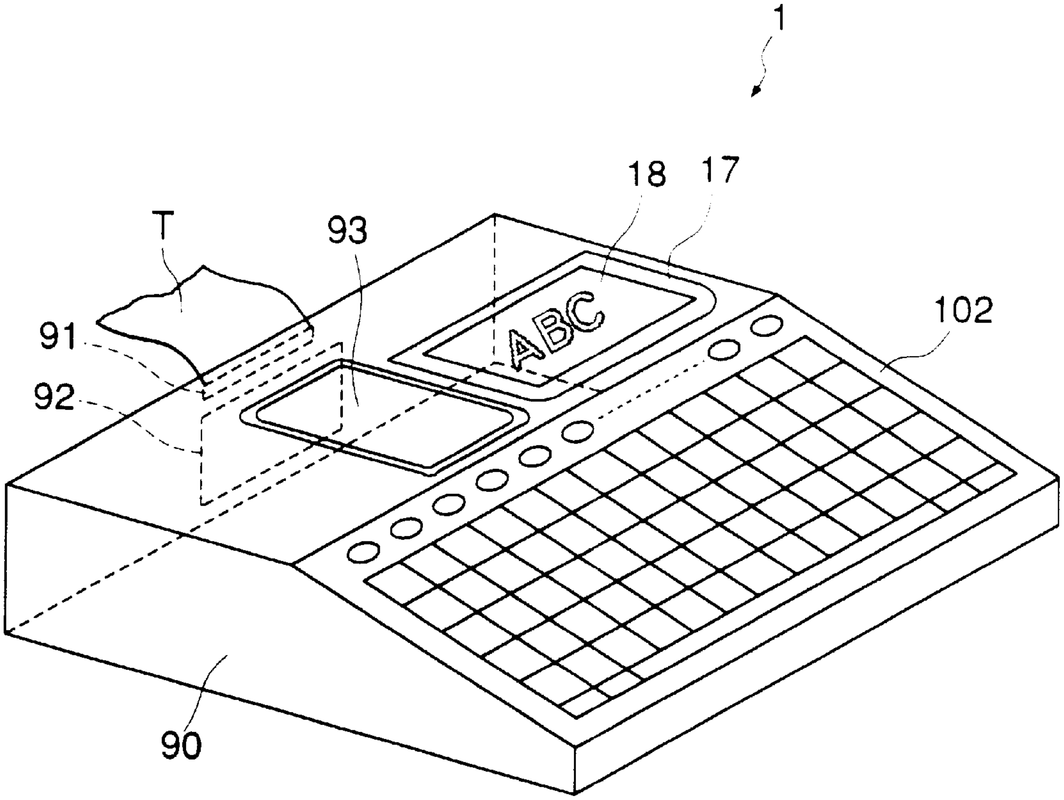
FIG. 1 is a perspective view of an apparatus of an ink jet printer to which the invention is applied.
Figure 2:
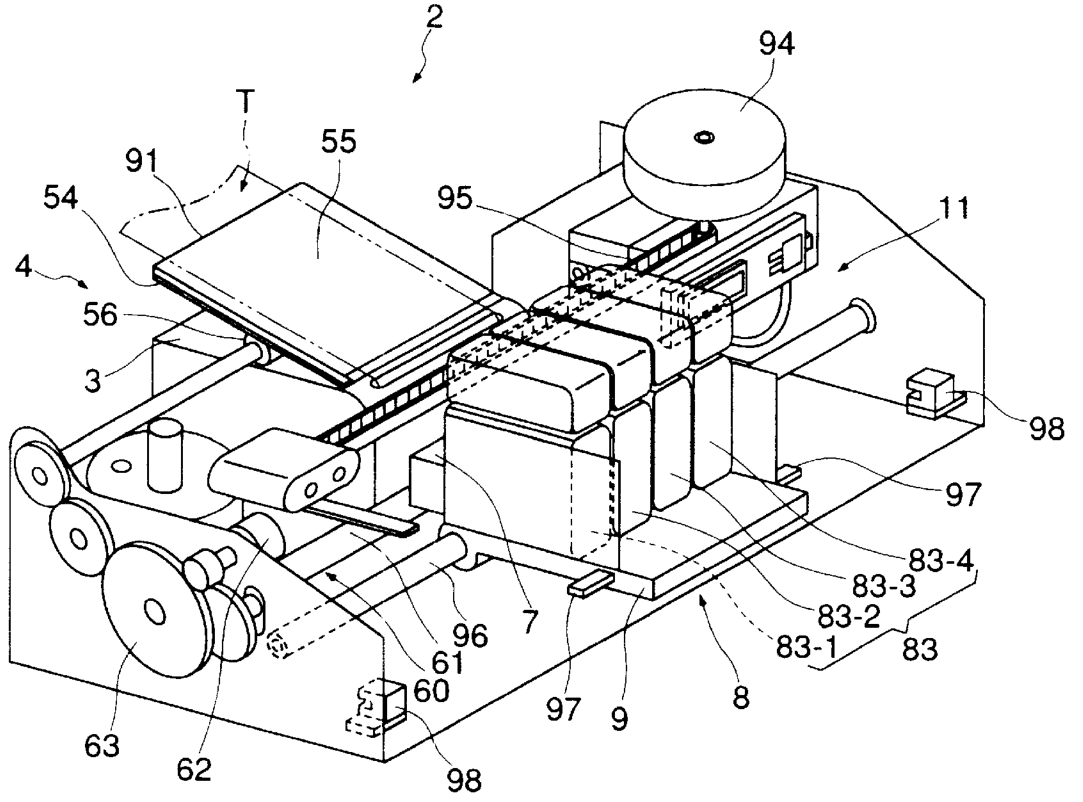
FIG. 2 is a schematic perspective view of a printer block incorporated in the FIG. 1 ink jet printer.

FIG. 1 is a perspective view of an appearance of an ink jet printer (tape printing apparatus) 1 incorporating the image display device according to the present embodiment. FIG. 2 is a schematic perspective view of a printer block 2 included in the ink jet printer shown in FIG. 1. The ink jet printer 1 is called a label printer, a label word processor or the like.

Referring to the figures, a peel-off paper-backed printing tape T is fed from a tape cartridge 3 loaded in a loading block 4 and color printing is carried out on the tape T by using an ink jet head 7. There are provided several kinds of printing tape T having different background colors, with various tape widths of 6 mm to 100 mm, each of which is supplied in a state contained in a tape cartridge 3 therefor. Print images having a resolution of 24 to 1024 dots in the direction of the width thereof are printed according to the width of the printing tape T.

Now, the arrangement of the ink jet printer 1 will be described in detail. As shown in FIG. 1, the ink jet printer 1 had a body casing 90 generally in the form of a thin rectangular parallelepiped, including a keyboard 102 arranged on a front portion of a top thereof and a liquid crystal display 17 in a right-side rear portion of the same. The keyboard 102 and the liquid crystal display 17 as well as a control block 200 referred to hereinafter with reference to FIG. 5 will be described in detail when the control system of the printer including the control block 200 is described.

Further, as shown in FIG. 1, a tape exit 91 for sending a printed tape T out of the ink jet printer 1 is formed through a central portion of a rear upper end of the body casing 90. At a location below the tape exit 91, there is arranged a lid 92 which can be opened and closed for exchanging tape cartridges 3, while a lid 93 which can be opened and closed for exchanging ink cartridges 8 is arranged at a central portion of the top of the body casing 90. The body casing 90 contains a power supply unit, a battery, such as a nicad battery. The printer block 2 shown in FIG. 2 is provided in a rear portion of the inside of the body casing 90.

Referring to FIG. 2, the printer block 2 includes the loading block 4 in which the tape cartridge 3 is removably loaded, the ink jet head 7 for printing characters and figures on a printing tape T, the ink cartridge 8 for supplying ink, and a cartridge 9 for removably loading the ink cartridges 8 thereon and moving the ink cartridge 8 and the ink jet head 7 forward and backward in the direction of the width of the printing tape T.

The carriage 9 is connected to a timing belt 95 which is driven in a normal or reverse direction according to normal or reverse rotation of a carriage motor (hereinafter referred to as "the CR motor") 94, and guided by a carriage guide shaft 96 for reciprocating motion in the direction of the width of the tape T. When one of shades 97 projecting from the carriage 9 in the direction parallel to the width of the tape T are brought before an associated one of position-detecting sensors 98 each comprised of a photo interrupter or the like, the ink jet head 7 is detected to be at a home position, not shown, whereby the correction of position of the ink jet head 7, such as zero position adjustment, is carried out.

The home position is not only serves as a standby position of the ink jet head 7 but also serves as a reference position for printing. The CR motor 94 rotates through predetermined numbers of steps to move the carriage 9 from the reference position, whereby the carriage 9 is brought to each position in the direction of the width of the tape T within a printing range with accuracy, and the ink jet head 7 is driven is synchronism with movement of the carriage 9 to thereby effect printing of characters and figures on a surface of the tape T in a desired manner. Further, the printer block 2 has a head cap mechanism 11 for closing ink nozzles of the ink jet head 7 and cleaning the same by using a pump motor 99 (see FIG. 5) as required.

Figure 3:
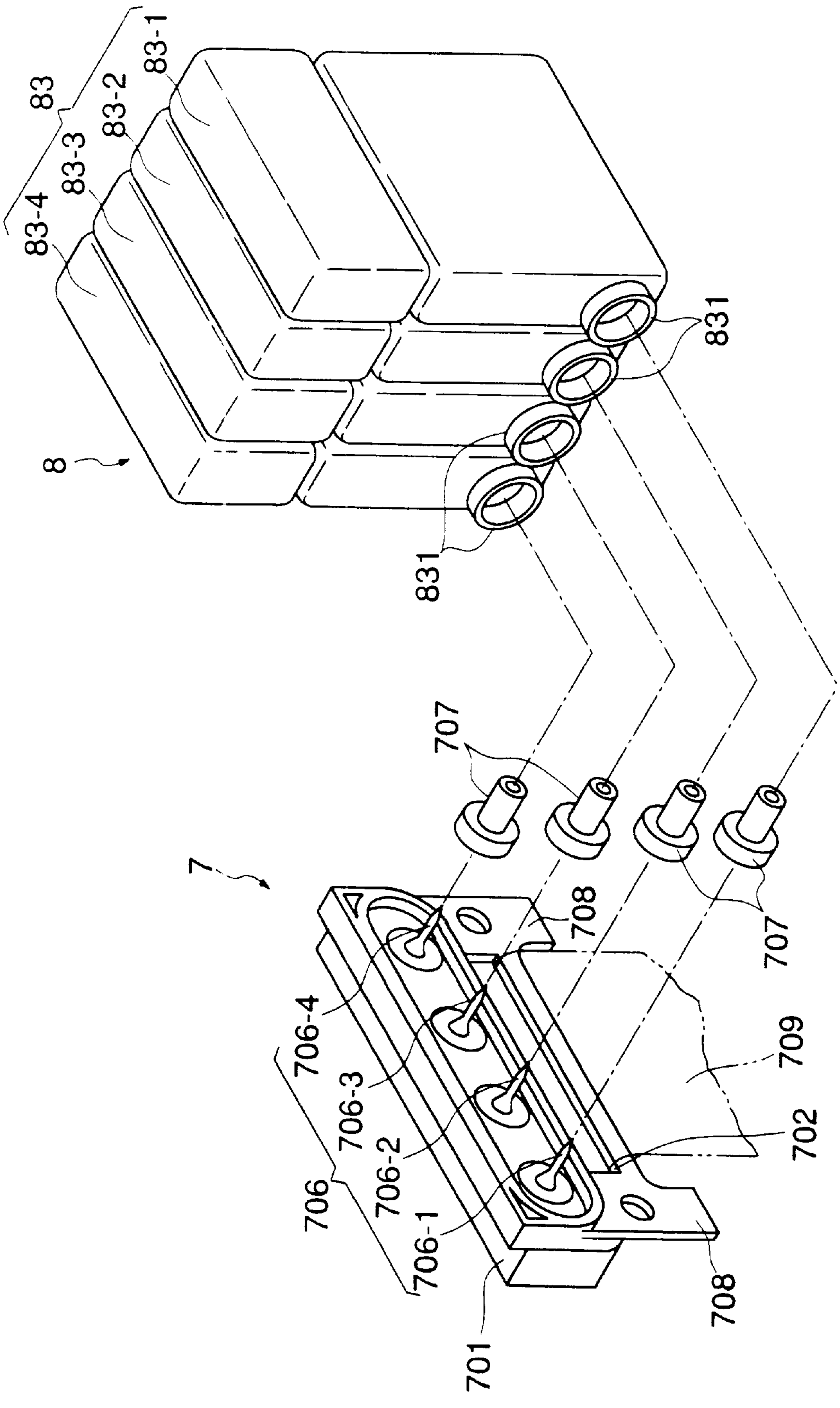
FIG. 3 is a schematic perspective view showing an ink jet head mounted in the FIG. 1 ink jet printer and an ink cartridge removably connected to the ink jet head.

As shown in FIG. 3, the ink jet head 7 includes a head casing 701 generally in the form of a rectangular parallelepiped. The head casing 701 has a front wall (tape cartridge-side wall) formed with a large number of ink nozzles, not shown, by using semiconductor manufacturing technology. Four head needles 706 (706-1, 706-2, 706-3, 706-4) project outward from the back of the ink jet head 7 and yellow ink, cyan ink, magenta ink and black ink held in respective four ink tanks 83 (83-1, 83-2, 83-3, 83-4) of the ink cartridge 8 are supplied via ink filter cartridges 707 inserted into ink supply holes 831 and head needles 706 inserted into the ink filter cartridges 707 to discharge ink droplets from the ink nozzles each corresponding to one of the colors of ink.

Mounting portions 708 formed on opposite lateral ends of the ink jet head 7 are fixed to the carriage 9 by screws or the like. Further, as indicated by phantom lines, a flexible cable 709 has one end thereof connected to the body of the ink jet head 7 arranged on the front side thereof through a slit 702 opening in the back of the ink jet head 7, and another end thereof connected to a head-driving circuit 281 (see FIG. 5) associated with the ink head jet 7. The ink jet head 7 is electrically driven by way the cable 709 by the head-driving circuit 291 to carry out an ink-discharging action.

Figure 4B:
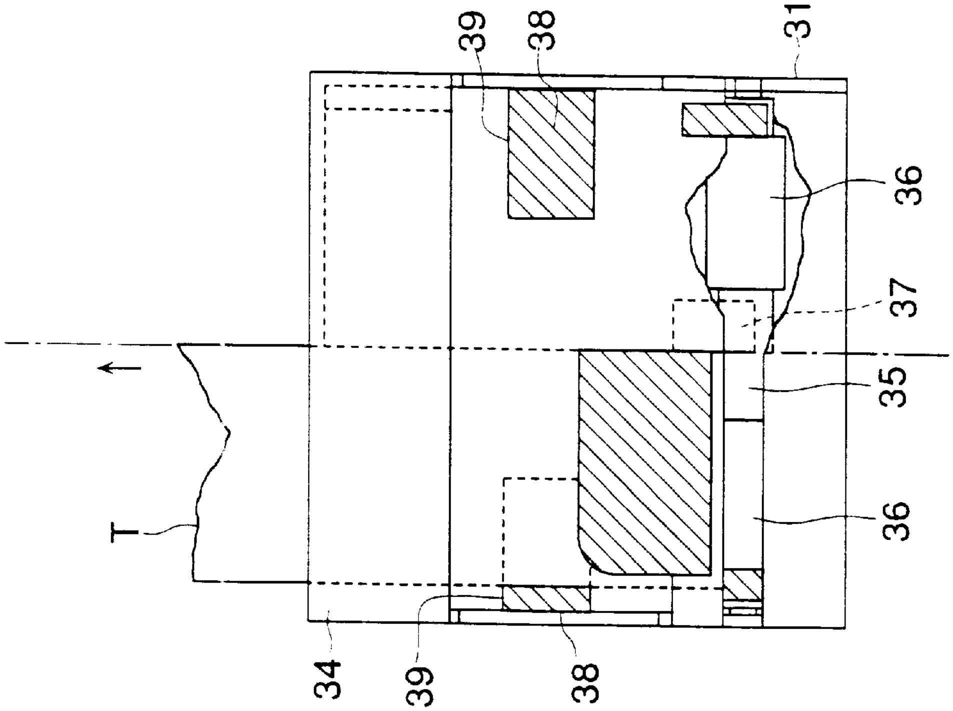
FIG. 4B is an explanatory view showing a front wall side of the tape cartridge.
Figure 4A:
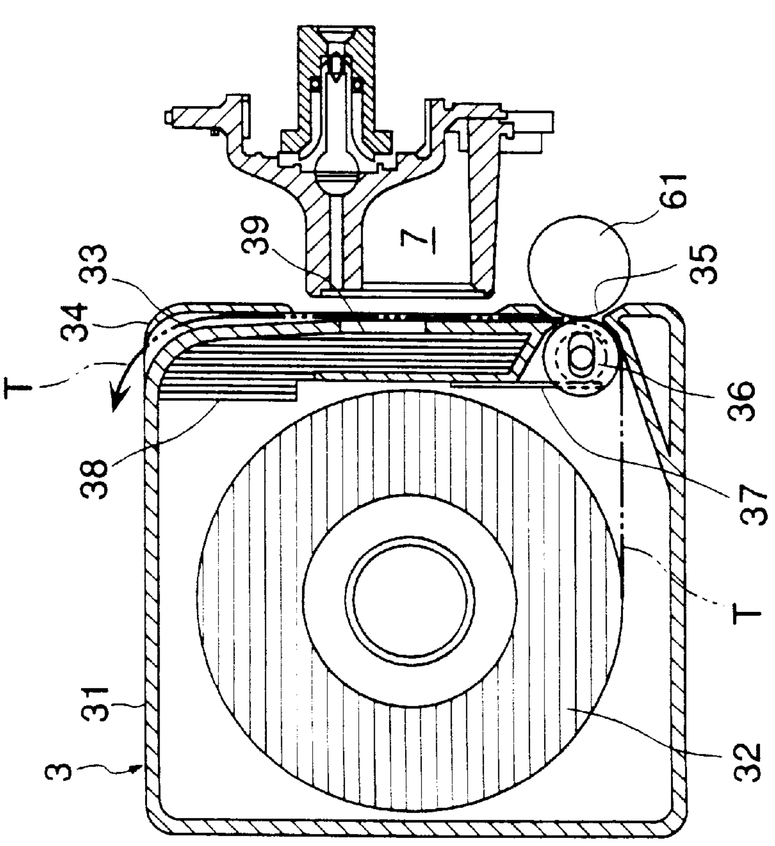
FIG. 4A is a schematic cross-sectional view showing a tape cartridge for the FIG. 1 ink jet printer and a portion of the printer at which the tape cartridge is mounted.

FIGS. 4A and 4B show the construction of the tape cartridge 3 in cross-section. The tape cartridge 3 has a cartridge casing 31 in the form of a rectangular parallelepiped. In a central portion inside the cartridge casing 31 there is arranged a tape roll 32 into which the tape T is wound. A pair of tape-retaining rollers 36 are arranged inside a tape-delivering hole 35 formed through a lower portion of a front wall 33, and held against a spring force of a leaf spring 37 attached to an inner wall of the tape cartridge 3. Further, inside the front wall 33, there is formed a waste ink-collecting block 38 filled with an ink absorbent, separately from the other blocks inside the tape cartridge 3. Part of the waste ink-collecting block 38 is exposed through a pair of collecting windows toward the ink jet head 7.

Referring again to FIG. 2, a tape feed mechanism 60 includes a feed roller 61, a paper feed motor (hereinafter referred to as "the PF motor") 62 mounted on a left-side wall of the printer block 2 and a reduction gear train 63 which is rotatably supported on an outer surface of the left-side wall of the printer block 2 to transmit torque from the PF motor 62 to the feed roller 61. As shown in FIGS. 4A and 4B, the tape T is fed upward by the feed roller 61 and printed by the ink jet head 7 as the printing area of the tape T passes the printing position located at an intermediate portion of the front wall 33. The printed portion of the tape T is fed along a feeding passage between the front wall 33 and an upper guide wall 34 and sent between a pair of guide plates 54, 55 disposed on a discharging roller 56 and extending from a rear-side central portion of the printer block 2 in a manner obliquely projecting backward, as viewed in FIG. 2, to be delivered out of the tape exit 91 of the body casing 90 (see FIG. 1).

Next, the basic configuration of the control system of the ink jet printer 1 will be described with reference to FIG. 5. The control system is basically comprised of the control block 200, the keyboard 102, the position-detecting sensors 98, a printer-driving circuit 280, a liquid crystal display (LCD)-driving circuit 290, and the liquid crystal display 17.

The position-detecting sensor 98 detects that the ink jet head 7 has reached the home position, as described above, to supply a signal indicative of the sensed position to the control block 200. The printer-driving circuit 280 includes the head-driving circuit 281 for driving the ink jet head 7 of the printer block 2 and a motor-driving circuit 282 for driving the CR motor 94, the PF motor 62 and the pump motor 99 to control the respective devices in the printer block 2 in response to control signals delivered from the control block 200 i.e. in accordance with instruction given by the control signals. Similarly, the liquid crystal display-driving circuit 290 controls the liquid crystal display 17 in accordance with instructions from the control block 200.

The liquid crystal display 17 having a rectangular shape of approximately 6 cm in a horizontal direction (X direction)×4 cm in a vertical direction (Y direction) has a display screen 18 which is capable of displaying display image data of 96×44 dots (see FIG. 1). The display screen 18 can be switched over between a text display mode for displaying text data and an image display mode for displaying image data.

In the text display mode, a character string image corresponding to text data is displayed so as to enable the device to display a predetermined guide message or a message (character string image) which prompts the user to input data or commands, or inversely, enable the user to enter text data via the keyboard 102 to cause character string image corresponding to the entered text data to be displayed for confirmation of the result of the entry. On the other hand, in the image display mode, an image representing part or whole of print image data (object image data) in a display range is displayed.

In other words, in the text display mode, the user can view a message from the device or enter text data while confirming the result of inputting operations, whereas in the image display mode, he can confirm or check print image data by viewing a displayed image thereof.

Further, in the image display mode, it is possible to change a proportion of the display range of the print image data (object image data) to the entire range of the print image data. Therefore, according to the ink jet printer 1 (image display device) of the present embodiment, by changing the proportion of the display range of the print image data to the entire range of the same, it is possible to expand the display range of the print range data for enabling the user to recognize the overall and general image representative of the object image data as well as reduce the display range to zoom in a desired portion (range) of the object image data, thereby allowing the user to view details of the image.

The method of changing the proportion includes e.g. a method of directly designating the proportion of the display range or area of print image data to the entire range or area of the same by specifying the proportion in percentage or in ratio. To the ink jet printer 1 is configured, however, such that the image representative of print image data (object image data) can be selectively zoomed in or out at predetermined ratios and schematized, if required, into symbolic images to display the same, thereby enabling the user to change the proportion of the display range.

On the keyboard 102 there are arranged a character key group 103 including an alphabet key group, a symbol key group, a number key group, a kana key group for entering Japanese hirakana letters and Japanese katakana letters, and a nonstandard character key group for calling nonstandard characters for selection, neither of which is shown, as well as a function key group 104 for designating various operation modes.

The function key group 104 includes a power key, not shown, a print key 106 for instructing printing operations, a selection key 107 for inputting data after character code conversion (normally carried out to display text in Japanese (kanji and kana) characters) and feeding lines during text entry as well as selecting various modes on a menu screen, a color specification key for specifying printing colors of the print image data GD, a color-setting key, neither of which is shown, and four cursor keys 110 (110U, 110D, 110L, 110R: hereinafter referred to as "the cursor "↑" key 110U" and the like) for moving the cursor in respective upward "↑", downward "↓", leftward "←", and rightward "→" directions.

Figure 7:
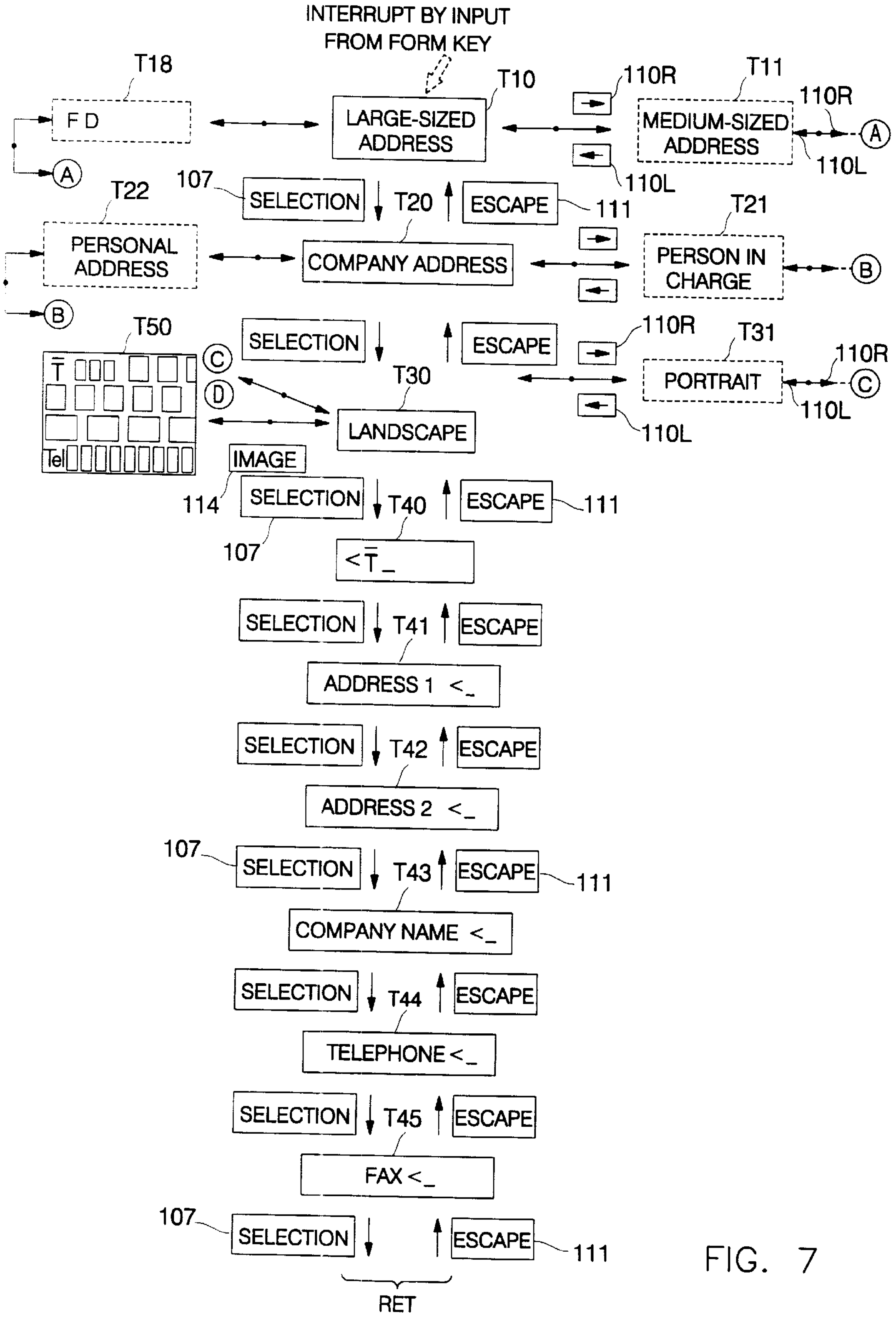
FIG. 7 is a flowchart showing a routine for carrying out an image display process during a fixed format image preparation process.

The function key group 104 further includes an escape key 111 for canceling instructions, a shift key, not shown, for use in changing roles of respective keys, a format key 113 for starting a fixed format-based image-forming process, described hereinafter, for forming print image data (object image data) according to fixed formats, an image key 114 for alternately switching between the text display mode and the image display mode of the above-mentioned display screen 18, a ratio-changing (zoom) key 115 for changing the proportion of the display range of the print image data to the entire range of the same on the display screen 18, and a backspace (BS) key for use in deleting only the last one of the entered and determined text data items. It should be noted that the selection key 107 and the escape key 111, the cursor keys 110R and 110L are schematically shown in FIG. 7 to represent the user's operation of each of them.

Needless to say, similarly to keyboards of a general type, the above key entries may be made by separate keys exclusively provided for respective key entries, or by a smaller number of keys operated in combination with a shift key or the like. Here, for purpose of ease of understanding, the following description will be made assuming that there are provided as many keys as described above.

Figure 5:
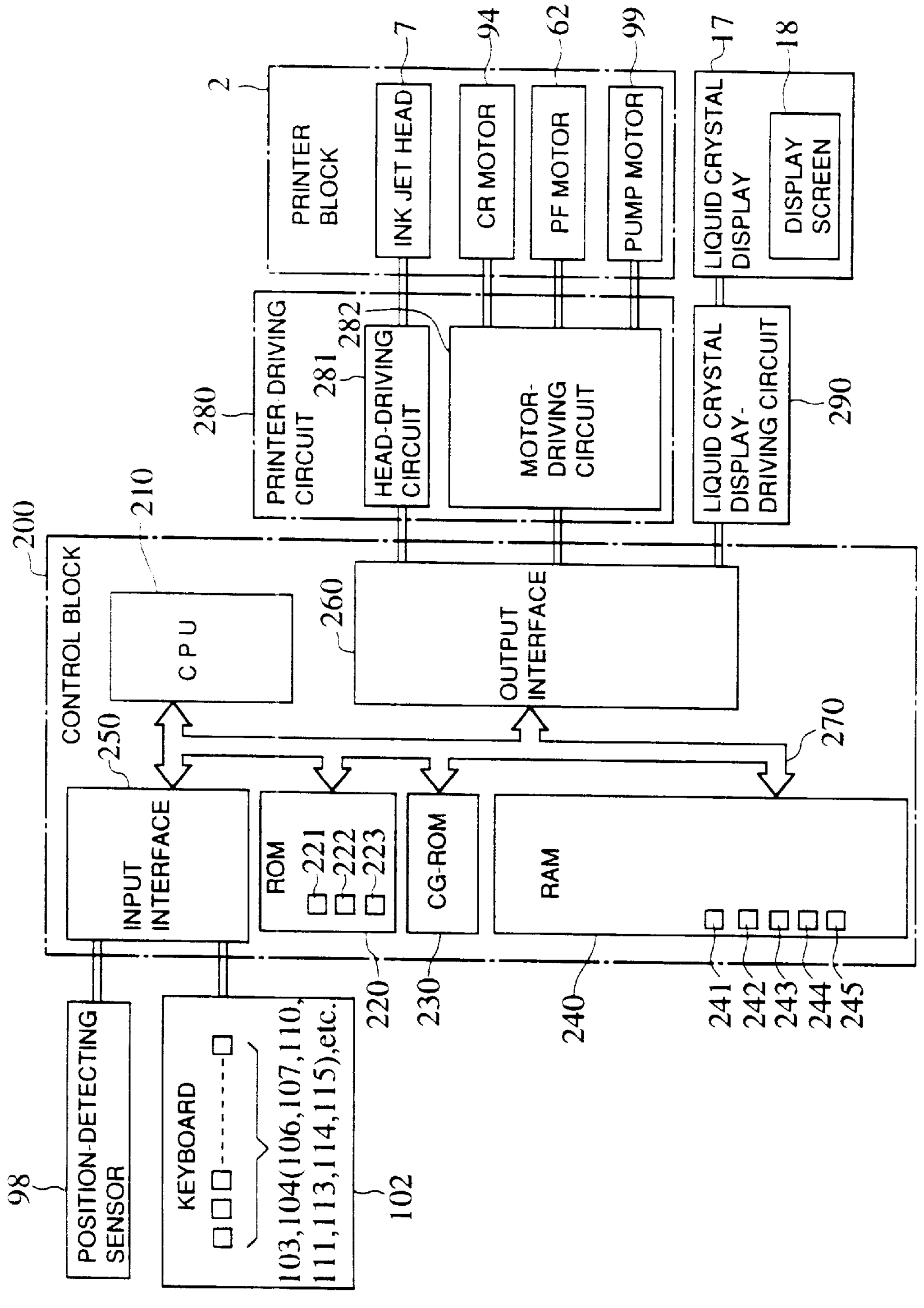
FIG. 5 is a block diagram showing the arrangement of a control system of the FIG. 1 ink jet printer.

Referring to FIG. 5, from the keyboard 102, various instructions described above and data are input to the control block 200.

The control block 200 includes a CPU 210, a ROM 220, a character generator ROM (hereinafter referring to as "the CG-ROM") 230, a RAM 240, an input interface 250, and an output interface 260, which are connected to each other by an internal bus 270.

The ROM 220 stores control programs executed by the CPU 210 as well as a color conversion table 221, a character modification table 222, and a presentation text data 223 for presenting fixed formats to the user. The CG-ROM 230 stores front data, i.e. data of characters, symbols, figures and the like, provided for the ink jet printer 1, and when code data for identifying characters or the like are input thereto, it outputs corresponding font data. In the present embodiment, the ink jet printer 1 is mainly used for printing Japanese language character strings, and hence the font data stored in the CG-ROM 230 includes font data of kanji characters, as well as hirakana characters and katakana characters of the Japanese syllabary.

The RAM 230 is supplied with power by a backup circuit, not shown, such that stored data items can be preserved even when the power is turned off by operating the power key. The RAM 240 includes areas of a register group 241, a text memory 242 for storing text data of letters or the like entered by the user via the keyboard 102, a displayed image data memory 243 for storing image data displayed on the display screen 18, a print image data memory 244 for storing print image data, and a conversion buffer memory 245, such as a color conversion buffer. The RAM 240 is used as a work area for carrying out the control process.

The input interface 250 is a circuit which is connected to the keyboard 102 and the position-detecting sensor 98, for receiving commands and data items entered via the keyboard 102 and position-detecting signals generated by the position-detecting sensor 98, into the internal bus 270. The output interface 260 is a circuit for delivering data items and control signals outputted to the internal bus 270 by the CPU 210 or the like to the printer-driving circuit 280 and the liquid crystal display-driving circuit 290.

The CPU 210 of the control block 200 receives via the input interface 250 the commands and data items entered via the keyboard 102 and the position-detecting signals from the position-detecting sensor 98 in accordance with control programs read out from the ROM 220, processes font data from the CG-ROM 230 and various data items stored in the RAM 240, delivers control signals to the printer-driving circuit 280 and the liquid crystal display-driving circuit 290 via the output interface 260 to thereby carry out the position control in printing operations, the display control of the display screen 18, and controls the ink jet head 7 to cause the same to carry out color printing on the tape T under predetermined printing conditions. In short, the CPU 210 controls the overall operation of the ink jet printer 1.

Next, the overall control process carried out by the ink jet printer 1 will be described with reference to FIG. 6. As shown in the figure, when the routine for carrying out the control process is started e.g. when the power to the ink jet printer 1 is applied, first, at a step S1, initialization of the system, such as restoring of saved control flags, is carried out to restore the ink jet printer 1 to the state it was in before the power was turned off the last time. Then, the image that was displayed on the display screen 18 before the power was turned off the last time is shown as the initial screen at a step S2.

Figure 6:
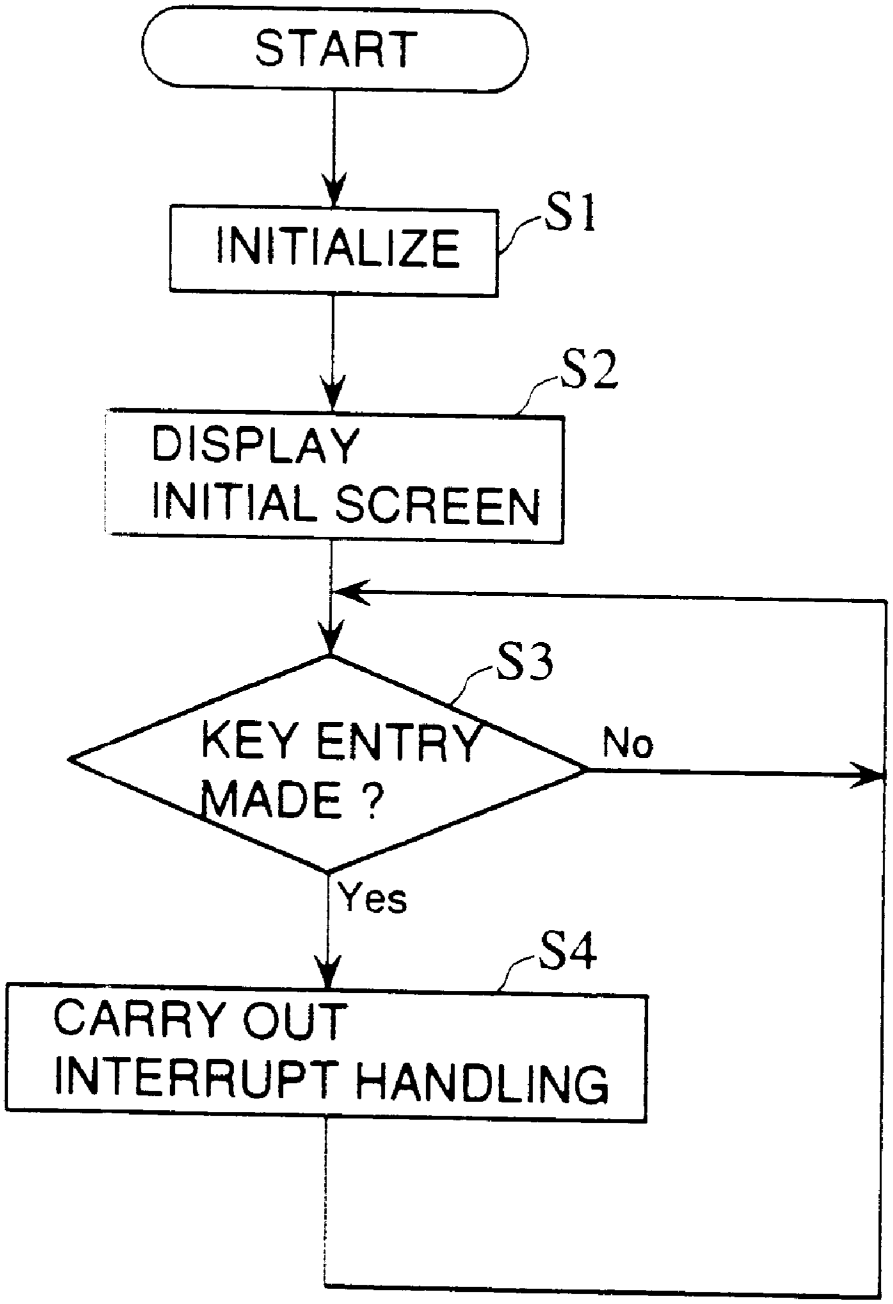
FIG. 6 is a flowchart showing an overall control process executing by the control system of the FIG. 1 ink jet printer.

The following steps in FIG. 6, that is, a step S3 for determining whether or not a key entry has been made and a step S4 for carrying out interrupt handling operations are conceptual representations of actual operations. Actually, when the initial screen display process is terminated at the step S2, the ink jet printer 1 enables an interrupt by key entry (keyboard interrupt), and maintains the key entry wait state (No to S3) until a keyboard interrupt is generated. When a keyboard interrupt is generated (Yes to S3), a corresponding interrupt handling routine is executed at the step S4, and after the interrupt handling routine is terminated, the key entry wait state is again enabled and maintained (No to S3).

Next, the fixed format-based image-forming process for forming print image data (object image data) by using a fixed format will be described. Further, main characterizing features of the invention are associated with contents displayed on the display screen 18 at respective steps of the process up to the determination of a designated format. Therefore, the following description will be made not by using an ordinary flowchart but by mainly using contents displayed on the display screen 18 and key operations made when each screen is displayed, with reference to FIGS. 7 et seq.

In the state described above with reference to FIG. 6 (key entry wait state), to form print image data by using a fixed format, the format key 113 is depressed to generate a keyboard interrupt to start a routine for carrying out the fixed format-based image-forming process. On the display screen 18, as shown in FIG. 7, there is first displayed an option of "大型住所" (Large-sized address) in kanji characters (screen T10: hereinafter, contents displayed on the display screen 18 are schematically shown in FIG. 7 with the reference numeral "T??" and referred to as "screen T??" (? represents a digit)).

Figure 13:
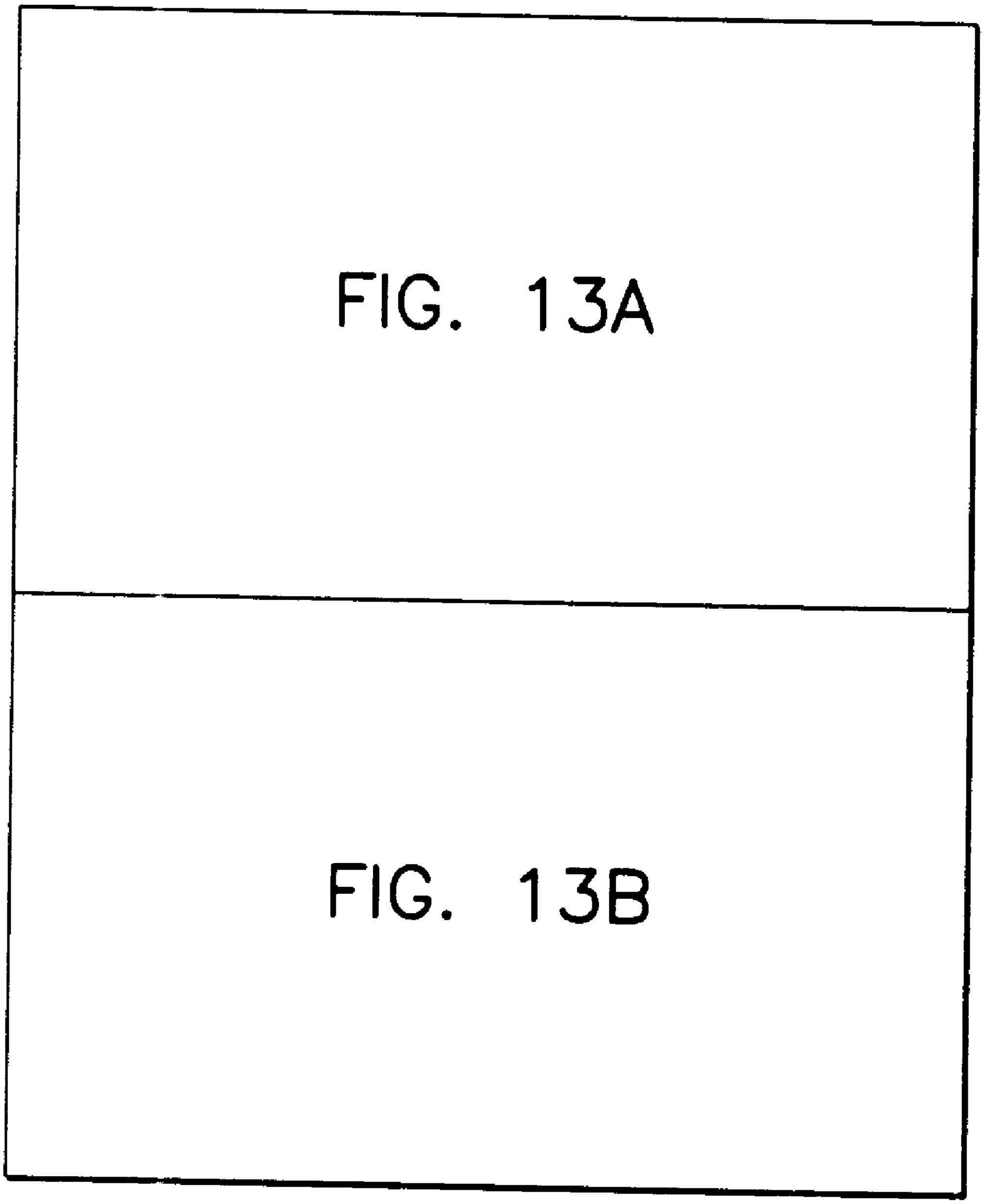
FIG. 13 is a diagram continued from FIG. 12.

According to the ink jet printer 1, various fixed formats selectively determined by the options enumerated in FIGS. 11 to 13 using character strings as displayed on the display screen 18 are provided for creating print image data, so that when the fixed format-based image-forming process is started, first, the display screen in the text display mode displays or presents options at a first level (OPTIONS 1 in FIGS. 11 to 13) for the user to select first in order to selectively determine one of available fixed format, which is set to a designated format to create print image based thereon.

Hence, as shown in FIG. 7 and FIGS. 11 to 13, first, a message of the option "大型住所" (Large-sized address) to be selected for forming or printing a large-sized address peal-off sticker is displayed as a first option at the first level (OPTIONS 1 in FIGS. 11 to 13) (T10).

More specifically, as described above with reference to FIG. 5, the ROM 220 stores the presentation text data 223 for presenting the fixed formats, and font data is read from the CG-ROM 230 according to codes of the presentation text data of the option to develop the font data as display image data in the display image data memory 243 of the RAM 240, thereby displaying the option of "大型住所" (Large-sized address) as one of the messages for presenting the fixed formats (T10). Images of other text data described hereinbelow are displayed in the same manner and detailed description thereof will be omitted.

In this state (T10), whenever the cursor "→" key 110R is depressed, the options at this level or menu can be displayed on the screen in a manner circulating from the option "大型住所" (Large-sized address) (T10) through an option "中型住所" (Medium-sized address) (T11), . . . , an option "FD" (T18), and back to the option "大型住所" (Large-sized address) (T10), whereas whenever the cursor "←" key 110L is depressed, the options can be also circularly displayed in an opposite direction to the direction of the above circulation.

However, parenthesized words descriptive of the use of each type of formats in FIGS. 11 and 13, such as "シール" (peal-off sticker) of the option "大型住所 (シール)" (Large-sized address (peel-off sticker)) are omitted from each image of the screen T?? in FIG. 7. It goes without saying the "DVD (Digital Video Disc)", "CD-ROM" and the like can be additionally provided as required as options representative of uses of available fixed formats.

In the above-mentioned state shown in FIG. 7, that is, in a state where the options can be circularly displayed, after selecting a desired option by operating any of the cursors 110 for display is referred to as "selective display"), by depressing the selection key 107, the desired option can be selected or determined.

In the above process, after selectively displaying the option of "大型住所" (Large-sized address) (T10), by depressing the selection key 107, corresponding options at a second level, that is, several of OPTIONS 2 shown in FIGS. 11 to 13 (in the present case, shown FIG. 11), which are immediately under the option "大型住所" (Large-sized address) are displayed. As the first option at this level, in the present case, an option of "会社住所用" (Company address) is displayed (T20).

It should be noted that according to the ink jet printer 1, a selection made by depressing the selection key 107 can be canceled by depressing the escape key 111 to return to the immediately preceding state. For instance,, in the above case, when the escape key 111 is depressed in the state of the option "会社住所用" (Company address) being displayed, the display screen returns to the state where the option "大型住所" (Large-sized address) (T10) at the immediately upper level is selectively displayed. The escape key 111 equally acts on key entries effected via other keys, such as those of the character key group 103, and hence in the following description, the key entry via the escape key 111 will be omitted.

In the state where the option "会社住所用" (Company address) (T20) is displayed, by depressing the selection key

107, as shown in FIGS. 7 and 11, it is possible to selectively display any of the options “会社住所用” (Company address) (T20), “担当住所用” (person in charge) (T21) and “個人住所用” (Personal address) (T22). After selecting any of the above options for display, by depressing the selection key 107, options at a still lower or third level (OPTIONS 3 shown in FIGS. 11 to 13, in the present case FIG. 11) are each selectively displayed.

For instance, after the option “会社住所用” (Company address) (T20) is selectively displayed, by depressing the selection key 107, an option of “横向” (Landscape) is displayed (T30) as a first option at a third level (Options 3) shown in FIG. 11. As shown in FIGS. 7 and 11, in this state, it is possible to selectively display the option “横向” (Landscape) (T30) or an option “縦向” (Portrait).

Next, for instance, when the option “横向” (Landscape) (T30) is selectively displayed and then the selection key 107 is depressed, as viewed in FIG. 11, there is no option at a still lower level and hence at this time a fixed format of “Company's large-sized address in landscape (peal-off sticker)” is selected through selection of the above-mentioned options at the first level and the second level and set to the designated format from various options of the fixed formats.

After determination or setting of the designated format, a message is displayed which prompts the user to enter data of predetermined entry items of print image data (object image data) to be created based on the designated format.

For instance, when the fixed format of “Company's large-sized address in landscape (peal-off sticker)” is set to the designated format through selection of the presented options, as shown in FIG. 11, there are provided Entry items 1 to 6: “郵便番号” (Postal code), “住所1” (Address 1), “住所2” (Address 2), “会社名” (Company name), “電話番号” (Telephone number) and “FAX番号” (FAX number), so that the user is prompted to enter data to the respective entry items sequentially, as shown in FIG. 7 (T40 to T45). It should be noted that the ink jet printer 1 of the present embodiment is assumed to be adapted to mainly print Japanese language (kanji and kana) characters, and hence the entry items shown in FIGS. 11 to 13 are enumerated in Japanese language images which, when referred to in the specification, will be followed by English translation in parentheses.

To guide an entry of a first entry item “郵便番号” (Postal code), the display of a generally known mark “〒” is more intuitive and easier to understand than the display of “郵便番号” (Postal code) in characters. Further, the mark “〒” is placed immediately after a mark “<” which prompts the use to input data to the entry item “郵便番号” (Postal code) as if the user has entered the mark “〒” as a text data item, such that the mark “〒” can be directly employed as part of the fixed format. An underlined portion “_____” appearing in FIG. 7 represents a cursor indicative of a location where text data is to be entered next. If the user would like to use another symbol or the like, the above marks can be deleted by depressing the BS key.

Since the next entry items “住所1” (Address 1) to “FAX番号” (FAX number) do not have any marks or signs customarily used such as the mark “〒” for the postal code, e.g. by displaying the symbol “<” as an entry guide mark immediately after the name of the entry item “住所1” (Address 1) and the cursor after the mark “<” the user is prompted to enter text data to the entry item “住所1” (Address 1) as contents thereof (T41). Similarly, the user is prompted to enter text data to the entry item “住所2” (Address 2) and entry items subsequent thereto.

The above-mentioned text data entered in accordance with the entry guide is stored in the text memory 242 in the RAM 240 as data of contents entered to predetermined entry items of the fixed format of “Company's large-sized address in landscape (peal-off sticker)” determined as a designated format, and by using the text data stored in the text memory 242, print image data corresponding to the designated format is formed.

As described above, according to the ink jet printer 1, messages presenting options for determining each fixed format is selectively displayed on the text screen and hence the user can selectively set one of the available fixed formats presented by the display to the designated format.

In the above process, text data of character strings, such as “大型住所（シール）” (Large-sized address (peal-off sticker)), “住所２（ラベル）” (Video (label)) and the like are provided to present uses of fixed formats as respective options, and the character strings are selectively displayed in the text display mode, whereby the user can clearly understand the uses of presented fixed formats.

Further, text entries are made in turn in accordance with entry guides of respective entry items after determining or setting the designated format, whereby it is possible to form print image data (object image data) in accordance with the desired designated format. Moreover, as described hereinbefore, after creating print image data, by depressing the image key 114 the text display mode can be changed over to the image display mode, which enables the user to view the resulting print image data on the image screen.

Still further, according to the ink jet printer 1, when each fixed format is presented in the text display mode, if the user finds it difficult to form in his mind an image representative of print image data to be created based on the fixed format, the image display mode can be used.

To this end, the fixed format being presented is provisionally set to the designated format, and at the same time dummy data is used instead of the text data to be input to the entry items, an image representative of part or whole of object image data created by using the dummy data is displayed on the image screen instead of the print image data to be created from input text data. In the text jet printer 1, text data of the symbol “■” is defined as the dummy data.

Figure 8A:
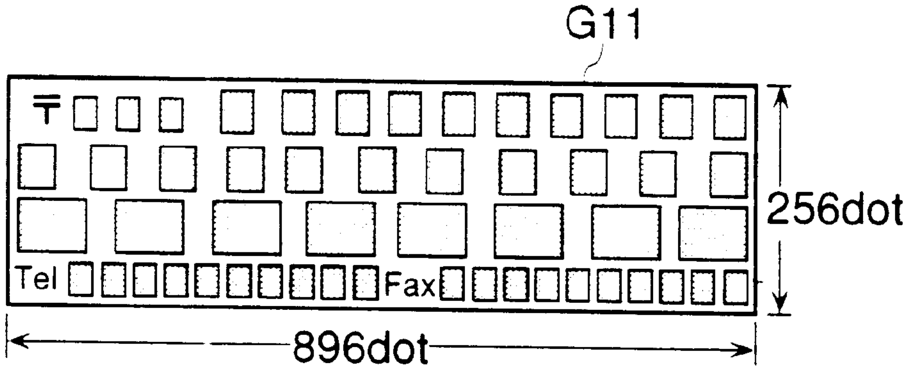
FIGS. 8A to 8C are diagrams showing examples of print image data formed according to respective fixed formats by using dummy data.

For instance,, when the image key 114 is depressed in the state (T30) of the option “横向” (Landscape) being displayed, as described above with reference to FIG. 7, it is possible to view in the image display mode an image representative of part or whole of the print image data G11 shown in FIG. 8A, which is created by using the dummy data of “■” instead of the entered text data, assuming that the above option “横向” (Landscape) is a constituent of the designated format, that is, by provisionally setting the above-mentioned “Company's Large-sized address in landscape (peal-off sticker)” to the designated format.

Figures 9A, 9B, 9C, 9D, 9E:
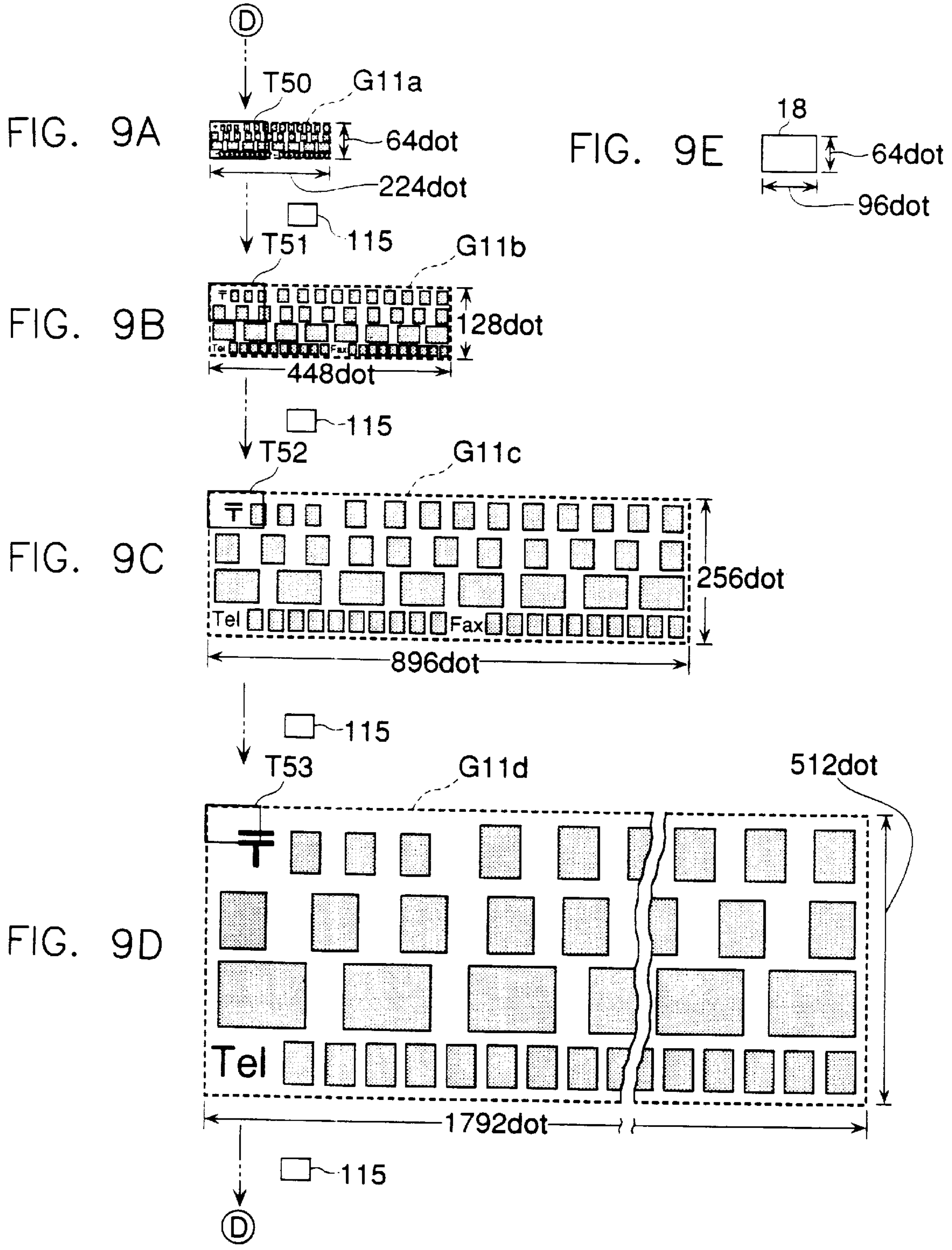
FIGS. 9A to 9E are diagrams which are useful in explaining the relationship between the size of displayed image data and the size of a display screen when the image representative of print image data displayed on the screen is zoomed in or out, with FIGS. 9A to 9D being continued from FIG. 7.

Due to limited space of the drawing sheet, the display screen 18 in FIG. 7 is depicted in a horizontally elongated space. However, the display screen 18 is, as described above, a screen of 96 dots in the horizontal direction (in the direction of the length thereof) ×64 dots in the vertical direction (in the direction of the width thereof), and actually the same is longer in the vertical direction than each screen depicted in FIG. 7. Therefore, when print image data G11 created based on the designated format is data having a size of 896 dots in the direction of the length thereof ×256 dots in the direction of the width thereof as shown in FIG. 8A, for instance, display image data G11*c* having the same dots is first formed and then part of the display image data C11*c* is extracted to display an image representative thereof in the image display mode of the display screen 18 with the size shown in FIG. 9E. The image displayed is shown by a screen (T52) appearing in FIG. 9C.

This enables the user to recognize an image representative of print image data (object image data) which is to be formed when text data is entered to the entry items before the same is actually entered thereto. Needless to say, the image of print image data (object image data) displayed in the image display mode of the display screen 18 can be scrolled in upward, downward, leftward and rightward directions to shift the display range by operating the cursor key 110. That is, the user can view the whole print image data by scrolling the image thereof.

Figure 8B:
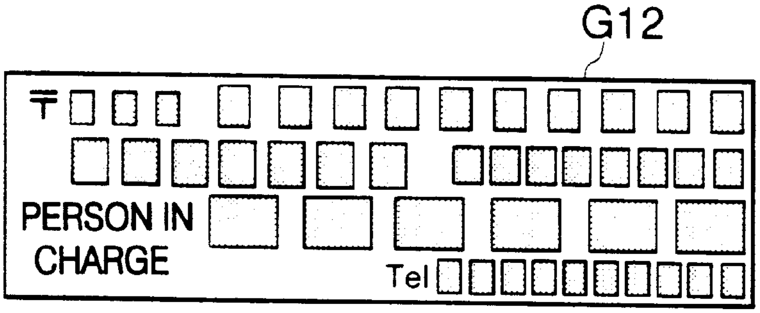
Figure 8C:
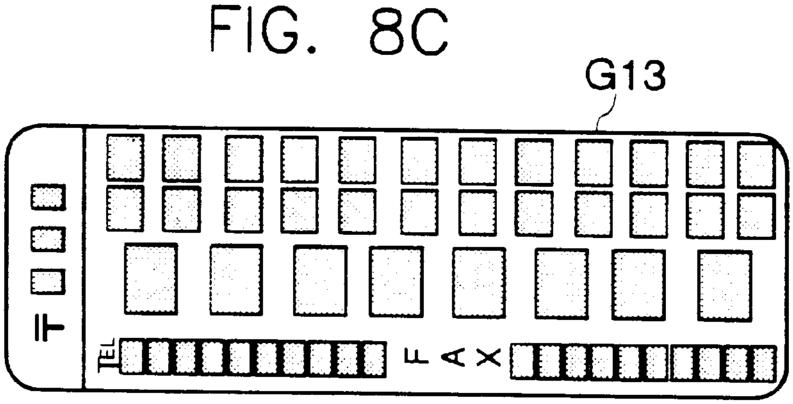

Similarly, when the fixed format of "Large-sized address of Person in charge in landscape (peal-off sticker))" and "Large-sized address of Personal address in portrait (peal-off sticker)" are each selectively displayed (presented) in the text display mode, by depressing the image key 114, it is possible to view part or whole of each image representative of print image data G12 and G13 created by using the dummy data by provisionally setting each of the above two formats to the designated format, as shown in FIGS. 8B and 8C.

Figure 10A:
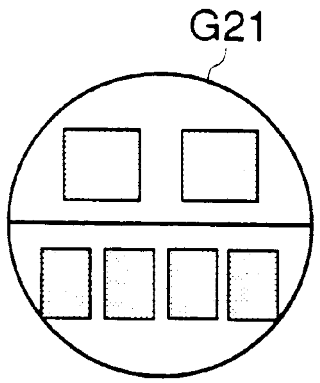
FIGS. 10A to 10C are diagrams similar to FIGS. 8A to 8C, showing other examples of print image data formed according to respective fixed formats by using dummy data.
Figure 10B:
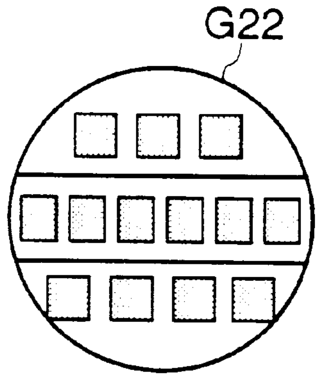
Figure 10C:
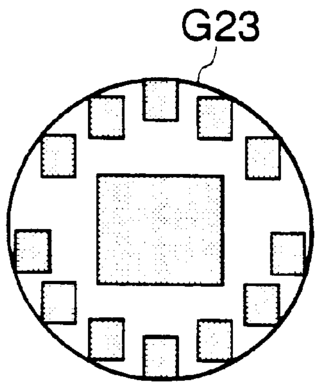

Similarly, it is possible to display part or whole of an image representative of print image data created based on any other fixed format to view the same. For instance,, when a fixed format "Round type divided in two (peal-off sticker)" determined by the selected options "丸型 (シール)" (Round type (peel-off sticker)) at the first level (OPTIONS 1) and "2分割" (divided in two) at the second level (OPTIONS 2), a fixed format "Round type divided in three (peal-off sticker)" determined by the selected options "丸型 (シール)" (Round type (peel-off sticker)) at the first level and "3分割" (divided in three) at the second level, or a fixed format "Round type encircled (peal-off sticker)" determined by the selected options "丸型 (シール)" (Round type (peel-off sticker) at the first level and "円周" (encircled) at the second level is being presented in the text display mode, by depressing the image key 114, it is possible to display part or whole of each image representative of corresponding print image data G21, G22 or G23 created by using the dummy data, as shown in a corresponding one of FIGS. 10A, 10B or 10C. In this manner, before text data is actually entered, the user can recognize a general or approximate image representative of print image data (object image data) which is to be formed when text data is actually entered to each entry item.

Further, as described above, according to the ink jet printer 1, the proportion of the display range of print image data to the entire range of the same can be changed in the image display mode. More specifically, through operating the zoom key 115, an image representative of print image data (object image data) is zoomed in or out at a predetermined zoom ratio ZM and schematized into a symbolic image if required, so as to display the resulting image representative of the print image data (object image data).

The ratio ZM is defined as follows: the ratio ZM=the size of display image data/the size of print image data. And whenever the zoom key 115 is depressed, the ratio ZM can be circularly changed, such as 1/1 (G11*c* in FIG. 9C)→2/1→2/1 (G11*d* in FIG. 9D)→2 2/1→4/1→1/32→2/32→ . . . →1/4 (G11*a* in FIG. 9A)→2/4→1/2 (G11*b* in FIG. 9B)→1/2→1/2 (G11*c*). As to the manner of changing the ratio ZM, the method of changing the zoom ratio ZM (i.e. image size ratio) disclosed in Japanese Patent Application No. 9-113567 is incorporated herein by reference.

It should be noted that the above ratio ZM may be changed by a method which is capable of changing the same in both directions. In this case, e.g. while the zoom key 115 is being depressed, by depressing the cursor "↑" key 110U, the ratio ZM may be changed in a direction of expansion thereof, whereas while the zoom key 115 is being depressed, by depressing the cursor "↓" key 110D, the ratio ZM may be changed in a direction of reduction thereof.

It goes without saying that a method may be adopted which directly designates the ratio of the display range of print image data to the whole of the same, e.g. by specifying percentage of the display range to the entire range of the print image data.

According to the ink jet printer 1, a standard size of print image data formed based on each fixed format is assumed to be 256 dots in the direction of the width thereof and hence the zoom ratio ZM is initialized to a value of ¼ such that the print image data in the direction of the width thereof can be viewed in its entirety on the image screen.

For instance, when the image key is depressed in the state in which the option "横向" (Landscape) described above with reference to FIG. 7 is displayed (T30), the image screen (T50) shown in the figure is displayed. Normally, in this state of the screen T50 which enables the user to recognize the overall and general image representative of print image data with ease, the cursor key 110 can be operated to display a desired portion (range) of the print image data, or zoom in the same through operation of the zoom key 115 to view details thereof.

As described above, according to the ink jet printer 1, by changing the ratio of the display range of print image data to the entire range of the same, it is possible to expand the display range thereof for recognizing the overall and general image representative of print image data (object image data), or alternatively to reduce the display range thereof to zoom in a desired portion (range) of the print image data (object image data) so as to view details of the same.

The above function of changing the proportion between the display range of print image data and the entire range of the same can be shared or exploited both when print image data is formed by using actually entered text data and when the same is formed by using dummy data, whereby it is possible to clearly display an image representative of print image data created based on each fixed format in a small-sized display screen with small memory capacity without additionally providing a special image-forming function or a special memory area only for displaying the general image representative of the print image data to be created based on the fixed format.

Further, in the above-mentioned case, the dummy data is used instead of text data to be entered, and simply by defining text data of a symbol such as "■" or the like as dummy data, it is possible to confirm or view print image data created by using the desired dummy data.

That is, instead of reading font data corresponding to text data actually entered from the CG-ROM 230 to develop the same as character string image data, a required number of character image data items each corresponding to the symbol "■" of the dummy data may be developed or stored in a required location to display the same, whereby, differently from the conventional method of selecting fixed formats presented using image data, there is no need to provide image data of fixed formats. This saves the memory capacity of the image device.

Further, in viewing print image data using actually entered text data, if the print image data is to be thinned to zoom out the image thereof beyond a certain level, it is required to schematize the image. To this end, the ink jet printer 1 uses the above symbol "■" defined as dummy data for schematic constituents of the schematized image. Thus, the dummy data is commonly used for the print image data-reducing function.

As described above, according to the ink jet printer 1, it is possible to switch between the text display mode for presenting uses (options) of fixed formats and the image display mode for displaying an image representative of print image data (object image data) created using the dummy data in a manner corresponding to each screen in the text display mode, which makes it possible to clearly display the uses of fixed formats for forming print images and the images representative of print image data (object image data) to be created based on the fixed formats, on a small-sized display screen with small memory capacity.

Figure 14A:
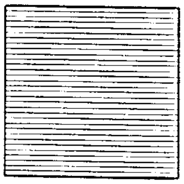
FIGS. 14A to 14E are diagrams showing examples of dummy data.
Figure 14D:
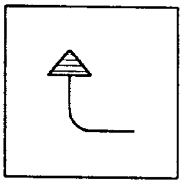
Figure 14B:
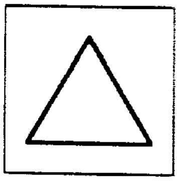
Figure 14E:
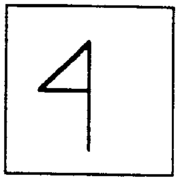
Figure 14C:
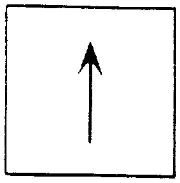

Although, as shown in FIGS. 14A to 14E, in the embodiment described above, the symbol "■" shown in FIG. 14A is used as dummy data, the image representative of each print image data (object image data) can be more easily viewed or recognized by using another mark with enables the user to discern its top, bottom, left and right sides from each other. To this end, any symbol or mark which enables the user to clearly recognize at least one of its top, bottom, left and right sides may be defined as dummy data, as shown in FIGS. 14B and 14C. Further, as shown in FIGS. 14D and 14E, it is more convenient to use a symbol the orientation of which can be easily recognized from any direction.

Further, although in the above embodiment, description has been made of an example in which the operating made of the display screen 18 is switched in the state of options being selectively displayed immediately before setting one of the options to the designated format, it is not limitative but the image display device may be configured such that even after setting the designated format, each image representative of print image data (object image data) created based on the designated format can be confirmed again before actually entering text data by displaying an image formed by using dummy data on the image screen similarly to the above embodiment.

Further, it is possible to adopt a method of employing dummy data even in the course of entering text data, as text data to be inputted to each entry item together with actually input text data. This makes it possible to view print image data (object image data) which is being formed, at a desired time point in the course of entering text data to the entry items.

In addition, the image display device may be configured such that not only immediately before determining or setting the designated format (e.g. the above-mentioned T30 in FIG. 7) but also in the state of the options at the upper level being selectively displayed (T10 or T20), an image representative of print image data (object image data) created based on a typical fixed format can be displayed. In this case, the typical fixed format may be set in advance in a program or the same may be selected by the user as desired to set it.

Further, instead of providing dummy data in the program for development of image data, the same may be stored with data of fixed formats. In this case, if no designated format has been set or determined, it is possible to copy the dummy data in an entered text data-processing area to thereby develop print image data created by using the text data in the area. If the designated format has been determined, after entering (writing) text data to entry items, it is possible to develop print image data formed by using dummy data for the remaining entry items to which text data not been entered yet.

Furthermore, the image display device may be configured such that when there is a blank entry item and the blank entry item is to be deleted to allocate its image-forming area among the remaining entry items, the user can consciously designate a blank item (e.g. by depressing the selection key, leaving the blank entry item as it is), while employing dummy data only for entry items which are not designated as blank ones and at the same time whose contents are not yet entered.

Although in the above embodiments the image display device according to the invention is applied to a tape printing apparatus of an ink jet type, this not limitative, but the same can be applied to a tape printing apparatus of a sublimation transfer type for sublimating ink by using a heating element of a thermal head or of a melting transfer type.

Still further, the image display device according to the invention can be applied to an information processing system other than the tape printing apparatus, e.g. to a stamp making apparatus, as an image display device thereof which forms stamp image data for forming a stamp face of a stamp based on a fixed format.

In the above embodiment, the image display device is applied to a tape printing apparatus and hence "大型住所 (シール)" (Large-sized address (peal-off sticker)), "住所２ (ラベル)" (Video (label)), etc. are employed as names of fixed formats. When the image display device is applied to a stamp making apparatus, however, text data of character strings or the like for presenting the uses of "大型住所 (スタンプ)" (Large-sized address (stamp)) and "丸型 (スタンプ)" (Round type (stamp)) are provided to thereby display corresponding presenting character string images. Therefore, similarly to the case of the image display device being applied to the tape printing apparatus, the user can clearly understand the uses of presented fixed formats by viewing the text in the text display mode and grasp images representative of print image data (object image data) formed according to each fixed format by viewing the image in the image display mode.

Although in the above embodiments, description is made assuming that the whole of object image data is expanded or reduced (or schematized) to form display image data for displaying part or whole of the resulting display image data as an image representative of the object image data on the image screen, this not limitative but only font data required for display may be developed or combined with text data of predetermined entry items of a designated format to form display image data and then, to scroll the display image data on the display screen, corresponding display image data may be formed in turn to enable the user to confirm or view the whole of object image data to be formed.

Needless to say, the above-mentioned dummy data is also text data and hence object image data to be formed by using the dummy data can be viewed in the same manner as described hereinabove. In the above cases, there is no need to store display image data for the whole of object image data, so that the capacity of the memory device can be saved.

The above-mentioned procedure of forming display image data can be followed in forming object image data. That is, when the image display device according to the invention is applied to a tape printing apparatus or a stamp making apparatus, print image data employed as object image data may be progressively formed e.g. during the execution of printing. In this case, if the display of print image data and the printing operation are simultaneously carried out, print image data can share the same memory area with the above display image data formed in the course of scrolling the same, which makes it possible to further save the memory area.

As described hereinbefore, according to the image display device of the invention, it is possible to clearly display the uses of fixed formats for selective use in forming print images and the image representative of print image data created based on the fixed formats in a small-sized display screen, with small memory capacity.

It is further understood by those skilled in the art that the foregoing are preferred embodiments of the invention, and that various changes and modification may be made thereto without departing from the spirit and scope thereof.

What is claimed is:

1. An image display device comprising:

input means for inputting commands and data;

display means having a display screen, said display means displaying an image of a character string corresponding to text data on said display screen in a text display mode thereof and displaying an image corresponding to image data including object image data on said display screen in an image display mode thereof;

display mode-switching means for switching between said text display mode and said image display mode of said display means;

fixed format-presenting means for selectively presenting, in said text display mode of said display means, a plurality of fixed formats for use in creating said object image data, said fixed formats each having predetermined entry items to which said text data is to be input;

designated format-setting means for selecting one of said fixed formats presented in said text display mode of said display means and setting said selected one of said fixed formats to a designated format;

input data-storing means for storing said text data input to said predetermined entry items of said designated format as input text data; and image display means for displaying, in said image display mode of said display means, an image representative of part or whole of said object image data created based on said designated fixed format by using said input text data, said image display means displaying, if no text data has been input to any of said predetermined entry items of said designated format, an image representative of part or whole of said object image data created by using dummy data for said text data to be input to said any of said predetermined entry items of said designated format.

2. An image display device according to claim 1, wherein said image display means provisionally setting, in said image display mode of said display means, one of said fixed formats being presented in said text display mode to said designated format if said designated format has not been set, and displaying an image representative of part or whole of said object image data created by using said dummy data for said text data to be input to said predetermined entry items of said one of said fixed formats provisionally set to said designated format.

3. An image display device according to claim 1, whereby said image display means includes display range proportion-changing means for changing a proportion of a display range of said object image data to an entire range of said object image data.

4. An image display device according to claim 2, wherein said image display means includes display range proportion-changing means for changing a proportion of a display range of said object image data to an entire range of said object image data.

5. An image display device according to claim 3, wherein said display range proportion-changing means changes said proportion of said display range of said object image data to said entire range of said object image data based on a zoom ratio at which a portion of said object image data in said display range is zoomed.

6. An image display device according to claim 3, wherein said image display means includes conversion means for converting said input text data to said dummy data when said display range proportion-changing means sets said proportion of said display range to a value smaller than a predetermined value.

7. An image display device according to claim 1, wherein said dummy data is text data of a symbol of which at least one of top, bottom, left, and right sides is discernable.

8. An image display device according to claim 2, wherein said dummy data is text data of a symbol of which at least one of top, bottom, left, and right sides is discernable.

9. An image display device according to claim 1, including font data-storing means which stores font data corresponding to said input text data and said dummy text data and from which said font data is read out.

10. An image display device according to claim 1, wherein said object image data is print image data for printing on a print material.

11. An image display device according to claim 2, wherein said object image data is print image data for forming a print on a print material.

12. An image display device according to claim 10, wherein said print material is a tape material.

13. An image display device according to claim 11, wherein said print material is a tape material.

14. An image display device according to claim 1, wherein said object image data is tamp image data for forming a stamp face of a stamp.

15. An image display device according to claim 2, wherein said object image data is stamp image data for forming a stamp face of a stamp.

* * * * *